United States Patent
Hong et al.

(10) Patent No.: US 9,019,690 B2
(45) Date of Patent: Apr. 28, 2015

(54) CONDUCTIVE RESIN COMPOSITION, MULTILAYER CERAMIC CAPACITOR HAVING THE SAME, AND METHOD OF MANUFACTURING THE MULTILAYER CERAMIC CAPACITOR

(71) Applicant: Samsung Electro-Mechanics Co., Ltd., Suwon, Gyunggi-do (KR)

(72) Inventors: Kyung Pyo Hong, Gyunggi-do (KR); Hyun Hee Gu, Gyunggi-do (KR); Byoung Jin Chun, Gyunggi-do (KR); Jae Hwan Han, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 68 days.

(21) Appl. No.: 13/793,448

(22) Filed: Mar. 11, 2013

(65) Prior Publication Data
US 2014/0192453 A1   Jul. 10, 2014

(30) Foreign Application Priority Data

Jan. 9, 2013   (KR) .................. 10-2013-0002559

(51) Int. Cl.
*H01G 4/228* (2006.01)
*H01G 4/008* (2006.01)
*H01G 4/12* (2006.01)

(52) U.S. Cl.
CPC . *H01G 4/008* (2013.01); *H01G 4/12* (2013.01)

(58) Field of Classification Search
USPC ............... 361/306.1, 306.3, 301.2, 301.4, 361/303–305, 311–313, 321.1, 321.2
See application file for complete search history.

(56) References Cited

U.S. PATENT DOCUMENTS

| 8,331,079 | B2* | 12/2012 | Hur et al. ................... 361/321.2 |
| 8,405,954 | B2* | 3/2013 | Koga et al. ................... 361/303 |
| 8,599,532 | B2* | 12/2013 | Sakuratani ................. 361/306.3 |
| 8,649,156 | B2* | 2/2014 | Takashima et al. .......... 361/303 |
| 8,687,345 | B2* | 4/2014 | Higashi et al. ............ 361/306.3 |

FOREIGN PATENT DOCUMENTS

KR   10-2011-0121572 A   11/2011

\* cited by examiner

*Primary Examiner* — Nguyen T Ha
(74) *Attorney, Agent, or Firm* — McDermott Will & Emery LLP

(57) ABSTRACT

There is provided a conductive resin composition including 10 to 50 wt % of a gel type silicon rubber such as polydimethylsiloxane (PDMS), and 50 to 90 wt % of conductive metal powder particles.

13 Claims, 1 Drawing Sheet

A-A'

CONDUCTIVE RESIN COMPOSITION, MULTILAYER CERAMIC CAPACITOR HAVING THE SAME, AND METHOD OF MANUFACTURING THE MULTILAYER CERAMIC CAPACITOR

CROSS-REFERENCE TO RELATED APPLICATIONS

This application claims the priority of Korean Patent Application No. 10-2013-0002559 filed on Jan. 9, 2013, in the Korean Intellectual Property Office, the disclosure of which is incorporated herein by reference.

BACKGROUND OF THE INVENTION

1. Field of the Invention

The present invention relates to a conductive resin composition, a multilayer ceramic capacitor having the conductive resin composition, and a method of manufacturing the multilayer ceramic capacitor.

2. Description of the Related Art

Representative electronic components using a ceramic material include a capacitor, an inductor, a piezoelectric element, a varistor, a thermistor, and the like.

A multilayer ceramic capacitor (MLCC) includes a ceramic element having a ceramic body formed of a ceramic material, internal electrodes formed within the ceramic body, and external electrodes formed on external surfaces of the ceramic body and electrically connected to respective internal electrodes, while having a small size, high capacitance and ease of mounting.

Due to the advantages as described above, the multilayer ceramic capacitor is commonly used as a chip type condenser mounted on a printed circuit board of an electronic product such as a computer, a personal digital assistant (PDA), a cellular phone, or the like, having an important role in charging and discharging electricity. The multilayer ceramic capacitor has various sizes and lamination types depending on the intended purpose and amount of capacitance thereof.

In particular, as electronic products have generally been reduced in size, microminiaturization and ultra-high capacitance of the multilayer ceramic capacitor have been also required. For achieving this goal, multilayer ceramic capacitors having thinner dielectric layers and internal electrodes and a large number of laminated dielectric layers have been manufactured.

Meanwhile, as many electronic devices required in fields such as the transportation and medical fields require high degrees of reliability, demand for reliable electronic devices has increased. Thus, high degrees of reliability in microminiature and ultra-high capacitance multilayer ceramic capacitors, in accordance with such demand, are required.

In realizing high reliability, the occurrence of cracks in external electrodes due to an external impact and the resultant permeation of a plating liquid into the ceramic body through the external electrodes at the time of a plating process are problematic.

Therefore, in order to solve the problems as described above, a resin composition including a conductive material is coated between the external electrode and the plating layer, thereby absorbing the external impact and effectively blocking permeation of the plating liquid and thus improving reliability. An external electrode having this structure is known as a soft-termination electrode.

However, in the related art, epoxy is mainly used as a resin component of such a conductive resin composition. In the case in which epoxy is used in the conductive resin composition, there is a predetermined limit to improving flexure strength of the external electrode of the multilayer ceramic capacitor due to the material properties thereof.

The Related Art Document below discloses that a conductive resin composition includes a silicon rubber in a multilayer 22 capacitor, and also includes an epoxy resin.

RELATED ART DOCUMENT

Korean Patent Laid-Open Publication No. 10-2011-0121572

SUMMARY OF THE INVENTION

An aspect of the present invention provides a soft-termination structure multilayer ceramic capacitor having excellent moisture resistance and improved flexure strength.

According to an aspect of the present invention, there is provided a conductive resin composition, including: 10 to 50 wt % of a gel type silicon rubber such as polydimethylsiloxane (PDMS); and 50 to 90 wt % of conductive metal powder particles.

The conductive resin composition may have viscosity of 8,000 to 50,000 cPs.

The conductive metal powder particles may include at least one of copper (Cu), silver (Ag), and copper coated with silver thereon.

According to another aspect of the present invention, there is provided a multilayer ceramic capacitor, including: a ceramic body having a plurality of laminated dielectric layers therein; a plurality of first and second internal electrodes formed on at least one surfaces of the dielectric layers, and alternately exposed to both end surfaces of the ceramic body; first and second external electrodes formed on both end surfaces of the ceramic body, respectively, and electrically connected to the first and second internal electrodes, respectively; first and second conductive resin layers formed on surfaces of the first and second external electrodes, respectively, the first and second conductive resin layers being formed of a conductive resin composition including 10 to 50 wt % of a gel type silicon rubber such as polydimethylsiloxane (PDMS) and 50 to 90 wt % of conductive metal powder particles; and first and second plating layers formed on surfaces of the first and second conductive resin layers, respectively.

Here, in the first and second conductive resin layers, a ratio of thickness of a part corresponding to a center portion of the ceramic body to thickness of a part corresponding to a corner portion of the ceramic body may satisfy a range of 1~5:1.

The first and second plating layers may respectively include a nickel (Ni) plating layer formed on the surface of the first and second conductive resin layers, respectively, and a tin (Sn) plating layer formed on a surface of the nickel plating layer.

According to another aspect of the present invention, there is provided a method of manufacturing a multilayer ceramic capacitor, the method including: preparing a plurality of ceramic sheets; forming first and second internal electrodes on at least one surfaces of the ceramic sheets, respectively; laminating the plurality of ceramic sheets having the first and second internal electrodes formed thereon to form a laminate; cutting the laminate such that one ends of the first and second internal electrodes are alternately exposed to both end surfaces of the laminate, respectively; firing the cut laminate to form a ceramic body having the plurality of first and second internal electrodes; forming first and second external electrodes of a conductive paste on both end surfaces of the ceramic body to thereby allow the first and second external electrodes to be electrically connected to exposed portions of the first and second internal electrodes, respectively; forming first and second conductive resin layers of a conductive resin paste on surfaces of the first and second external electrodes, the conductive resin paste including 10 to 50 wt % of a gel type silicon rubber such as polydimethylsiloxane (PDMS) and 50 to 90 wt % of conductive metal powder particles; and plating surfaces of the first and second conductive resin layers.

Here, in the forming of the first and second conductive resin layers, the conductive resin paste may have viscosity of 8,000 to 50,000 cPs.

Here, in the forming of the first and second conductive resin layers, conductive metal powder particles of the conductive resin paste may include at least one of copper (Cu), silver (Ag), and copper coated with silver thereon.

Here, in the forming of the first and second conductive resin layers, a ratio of thickness of respective parts corresponding to both end surfaces of the ceramic body and a thickness of a part corresponding to a corner portion of the ceramic body may satisfy a range of 1~5:1.

Here, in the plating of the surfaces of the first and second conductive resin layers, a nickel (Ni) plating layer may be formed on the surfaces of the first and second conductive resin layers and then a tin (Sn) plating layer may be formed on a surface of the nickel plating layer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

A ceramic electronic component is provided according to an embodiment of the present invention. The ceramic electronic component according to an embodiment of the present invention may be a multilayered ceramic capacitor, an inductor, a piezoelectric element, a varistor, a chip resistor, a thermistor, or the like. The multilayer ceramic capacitor will be described as an example of the ceramic electronic component as follows.

Figure 1:
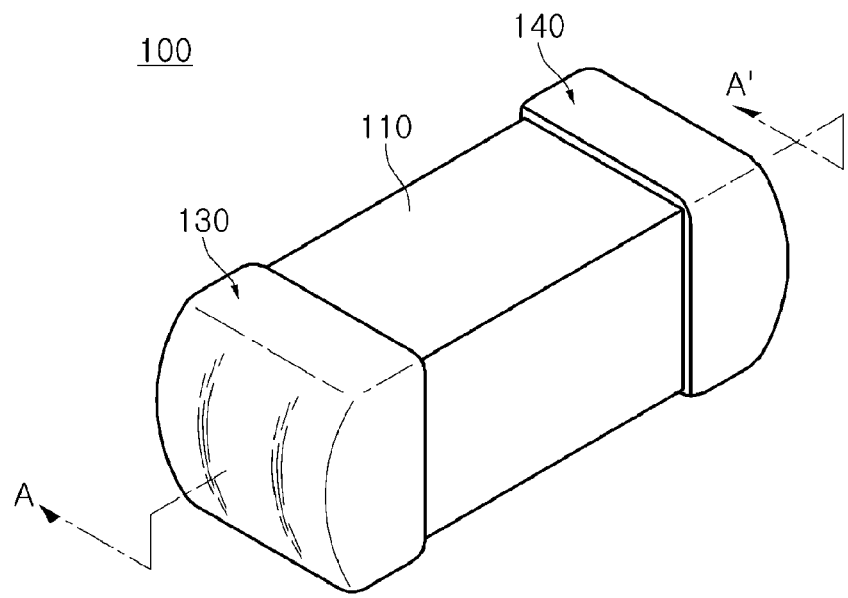
FIG. 1 is a perspective view schematically showing a multilayer ceramic capacitor according to an embodiment of the present invention.
Figure 2:
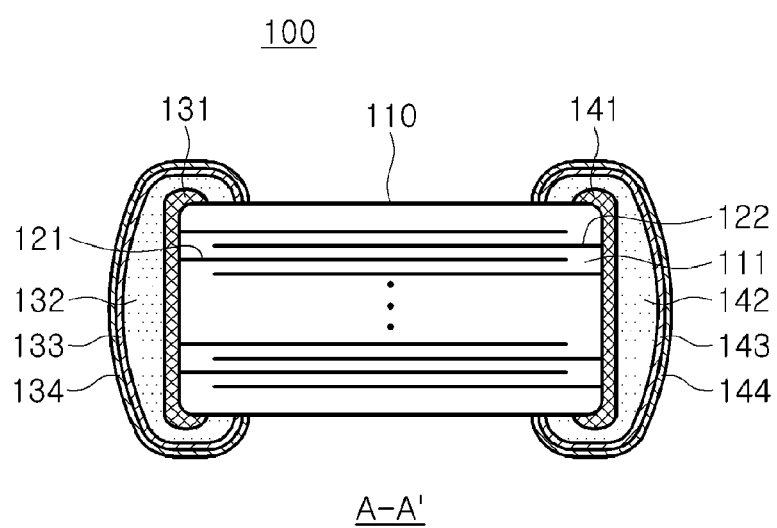
FIG. 2 is a cross-sectional view taken along line A-A' of FIG. 1.

Referring to FIGS. 1 and 2, a multilayer ceramic capacitor 100 according to the present embodiment may include a ceramic body 110 having a plurality of dielectric layers 111 laminated therein; a plurality of first and second internal electrodes 121 and 122 formed on at least one surfaces of the dielectric layers 111, respectively; first and second external electrodes 131 and 132 formed on both end surfaces of the ceramic body 110 and electrically connected to the first and second internal electrodes 121 and 122; first and second conductive resin layers 132 and 142 formed on surfaces of the first and second external electrodes 131 and 141, respectively; and first and second plating layers 133, 134, 143, and 144 formed on surfaces of the first and second conductive resin layers 131 and 132, respectively.

The ceramic body 110 is formed by laminating the plurality of dielectric layers 111, followed by firing. The dielectric layers 111 may be integrated with each other such that boundaries between neighboring dielectric layers 111 may not be readily discernible without a scanning electron microscope (SEM).

The ceramic body 110 may have a rectangular parallelepiped shape, but the present invention is not limited thereto. In addition, the ceramic body 110 is not particularly limited in view of dimensions thereof, but the ceramic body 110 may have a size of 0.6 mm×0.3 mm or the like, for example, to thereby constitute a high-capacitance multilayer ceramic capacitor. In addition, as necessary, a cover part dielectric layer (not shown) having a predetermined thickness may further be formed on the outermost surfaces of the ceramic body 110.

The dielectric layers 111 contribute to capacitance formation, and one dielectric layer thickness may be optionally changed according to the capacitance design of the multilayer ceramic capacitor 100. A thickness of a single dielectric layer may be 0.1 to 1.0 μm after firing, but the present invention is not limited thereto.

In addition, the dielectric layer 111 may include a high-dielectric ceramic material, and for example, may include a $BaTiO_3$ based ceramic powder or the like, but the present invention is not limited thereto.

The $BaTiO_3$ based ceramic powder may be for example $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like is included in $BaTiO_3$, but the present invention is not limited thereto.

Meanwhile, various ceramic additives such as transition metal oxides or carbides, rare earth elements, Mg or Al, or the like, organic solvents, plasticizers, binders, dispersants, or the like may be added into the dielectric layer 111, in addition to the ceramic powder.

The first and second internal electrodes 121 and 122 are formed on ceramic sheets for forming the dielectric layers 111, and then laminated and fired, so that the first and second internal electrodes 121 and 122 are formed inside the ceramic body 110 while a single dielectric layer 111 is interposed between the first internal electrode and the second internal electrode.

The first and second internal electrodes 121 and 122 constitute pairs of electrodes having different polarities. The first and second internal electrodes 121 and 122 are disposed oppositely to each other in a lamination direction of the dielectric layers 111, and electrically insulated from each other by the dielectric layers 111 interposed therebetween.

In addition, ends of the first and second internal electrodes 121 and 122 are respectively exposed to both end surfaces of the ceramic body 110, and the ends of the first and second internal electrodes 121 and 122, which are alternately exposed to both end surfaces of the ceramic body 110, are electrically connected to the first and second external electrodes 131 and 141, respectively.

The first and second internal electrodes 121 and 122 are formed of a conductive metal, for example nickel (Ni) or a nickel (Ni) alloy, but the present invention is not limited thereto.

Therefore, when a predetermined voltage is applied to the first and second external electrodes 131 and 141, charges are formed between the first and second internal electrodes 121 and 122 opposite to each other. Here, the capacitance of the multilayered ceramic capacitor 100 is proportional to the area of an overlapping region between the first and second internal electrodes 121 and 122 in the lamination direction of the dielectric layers 111.

The first and second external electrodes 131 and 141 may be formed by firing a conductive paste for an external electrode, including copper (Cu), in order to provide a high degree of reliability, such as good electric characteristics, excellent heat-cycle resistance, moisture resistance, and the like, but the present invention is not limited thereto.

The first and second plating layers 133, 134, 143, and 144 enhance adhesive strength when the multilayer ceramic capacitor 100 is soldering-mounted on a board or the like. A plating treatment may be carried out by the known methods, and lead-free plating may be performed in consideration of the environment, but the present invention is not limited thereto.

In addition, the first and second plating layers 133, 134, 143, and 144 may include a pair of nickel (Ni) plating layers 133 and 143 respectively formed on outer surfaces of the first and second conductive resin layers 132 and 142, and a pair of tin (Sn) plating layers 134 and 144 respectively formed on outer surfaces of the nickel plating layers 133 and 143.

The first and second conductive resin layers 132 and 142 may be formed of a conductive resin composition including 10 to 50 wt % of a liquid phase or gel type silicon rubber such as polydimethylsiloxane (PDMS) and 50 to 90 wt % of conductive metal powder particles, instead of using the existing epoxy.

Here, in the case in which the silicon rubber has a solid phase but not a gel type, this indicates that resin molecules are cross-linked, and thus polymerized. This solid phase silicon rubber is stable in view of thermal properties and chemical resistance properties. However, this has a state in which the resin molecules are not dissolved in the solvent, that is, a state in which the resin molecules and the solvent are not mixed with each other, and thus has difficulty in functioning as a paste, for coating the external electrodes.

Whereas, as in the present embodiment, in the case in which the silicon rubber has a liquid phase or a gel type, the silicon rubber has a low-molecular state in which the resin molecules are not cross-linked. This liquid phase silicon rubber maintains a low viscosity form while the resin molecules are dispersed therein. In addition, at the time of adding the solvent for viscosity control, resin particles are uniformly distributed among the resin molecules.

Therefore, due to the above functional difference, in the case in which the silicon rubber is used alone, a liquid phase or gel type paste needs to be prepared.

In addition, when the content of the conductive metal powder particles is below 50 wt %, it may be difficult to implement capacitance of the multilayer ceramic capacitor 100 and the first and second plating layers 133, 134, 143, and 144 may not be properly formed.

In addition, when the content of the conductive metal powder particles is above 90 wt %, the content of the silicon rubber is relatively insufficient, and thus it may be difficult to prepare the paste, and the flexure strength improving effect may be deteriorated.

The conductive metal powder particles of the conductive resin composition may include at least one of copper (Cu), silver (Ag), and copper coated with silver thereon.

Table 1 below shows an evaluation of flexure strength of the multilayer ceramic capacitor according to whether or not epoxy is used in the conductive resin composition constituting the conductive resin layer.

TABLE 1

| No | Epoxy + PDMS Particle (Comparative Example) | PDMS Hardening (Inventive Example) |
|---|---|---|
| 1 | 2.1 | 15.0 |
| 2 | 2.1 | 15.0 |
| 3 | 15.0 | 15.0 |
| 4 | 10.1 | 9.4 |
| 5 | 10.3 | 15.0 |
| 6 | 14.5 | 15.0 |
| 7 | 12.4 | 15.0 |
| 8 | 2.0 | 15.0 |
| 9 | 15.0 | 15.0 |
| 10 | 12.6 | 15.0 |
| 11 | 14.8 | 14.8 |
| 12 | 15.0 | 15.0 |
| 13 | 15.0 | 15.0 |
| 14 | 15.0 | 15.0 |
| 15 | 13.3 | 13.3 |
| 16 | 15.0 | 15.0 |
| 17 | 11.2 | 11.2 |
| 18 | 4.4 | 6.4 |
| 19 | 15.0 | 15.0 |
| 20 | 15.0 | 15.0 |
| Average Value (mm) | 11.5 | 14.0 |
| Minimumm Value (mm) | 2.0 | 6.4 |

Here, in the case of the comparative examples, 20 multilayer ceramic capacitor samples in which the conductive resin layers 132 and 142 are formed of a mixture material of epoxy and silicon rubber particles were subjected to the 15 mm flexure test, and flexure strength values thereof were shown. As for inventive examples, 20 multilayer ceramic capacitor samples in which the conductive resin layers 132 and 142 are formed of a material in which a silicon rubber is hardened without using epoxy were subjected to the 15 mm flexure test, and flexure strength values thereof were shown.

Referring to Table 1 above, it may be seen that the average flexure strength value and the minimum flexure strength value of the inventive examples were 14.0 mm and 6.4 mm, respectively, significantly higher than those of the comparative examples.

That is, it may be confirmed that, in the multilayer ceramic capacitor 100 using hardening type external electrodes in which the silicon rubber instead of epoxy was used as a conductive resin composition of the conductive resin layers 132 and 142, the flexure strength thereof was improved.

Meanwhile, Table 2 below shows evaluation as to whether the electrode flow (mooning) and the thickness uniformity of the multilayer ceramic capacitor 100 are good or bad according to the viscosity of the conductive resin composition constituting the conductive resin layers 132 and 142.

Here, as for the 'thickness uniformity', when the ratio of thickness of a part corresponding to a center portion of the ceramic body 110 and a thickness of a part corresponding to a corner portion of the ceramic body 110 in the conductive resin layers 132 and 142 satisfies the range of 1~5:1, the ratio is judged to be good, but when the ratio is outside of this range, the ratio is judged to be bad.

Also, as for the 'electrode flow (mooning)', when a band portion of the external electrode of the multilayer ceramic capacitor 100 is expanded toward an inside of the ceramic body 110 by 20% or more as compared with the design, it is judged to be bad.

TABLE 2

| Viscosity of Conductive Resin Composition (cPs) | Electrode Flow (Mooning) | Thickness Uniformity |
|---|---|---|
| 2,000 | X | X |
| 5,000 | X | ○ |
| 8,000 | ○ | ○ |
| 13,000 | ○ | ○ |
| 16,000 | ○ | ○ |
| 20,000 | ○ | ○ |
| 25,000 | ○ | ○ |
| 30,000 | ○ | ○ |
| 36,000 | ○ | ○ |
| 42,000 | ○ | ○ |
| 50,000 | ○ | ○ |
| 60,000 | ○ | X |
| 70,000 | ○ | X |

X: Bad,
○: Good

Generally, in the case of a firing type external electrode, the thickness of the external electrode may be controlled during a firing procedure. However, as for the hardening type external electrode like the present embodiment, the coated state of the conductive resin composition is not changed until the finished product is produced, and thus, the thickness of the external electrode is significantly influenced by the viscosity of the conductive resin composition.

Referring to Table 2 above, it may be confirmed that, when the conductive resin layers 132 and 142 were formed of a conductive resin composition having a viscosity of 2,000 cPs or lower or 60,000 cPs or higher, the 'thickness uniformity' was bad.

In addition, it may be confirmed that, when the conductive resin layers 132 and 142 were formed of a conductive resin composition having viscosity of 5,000 cPs or lower, the degree of 'electrode flow (mooning)' was bad.

Therefore, it may be seen that the conductive resin composition of the present embodiment may have viscosity of 8,000 to 50,000.

Hereinafter, a method of manufacturing a multilayer ceramic capacitor according to the embodiment of the present invention will be described.

First, a plurality of ceramic sheets are prepared.

The ceramic sheets are for forming a dielectric layer 111 of a ceramic body 110, and may be formed by mixing a ceramic powder, a polymer, and a solvent to prepare a slurry and molding the slurry into a sheet with a thickness of several μm through a doctor blade method or the like.

Then, a predetermined thickness of a conductive paste is printed on at least one surface of each of the ceramic sheets, to form first and second internal electrodes 121 and 122.

Here, the first and second internal electrodes 121 and 122 are respectively exposed to both end surfaces of the respective ceramic sheets opposite to each other.

In addition, the conductive paste may be printed by a screen printing method, a gravure printing method, or the like, but the present invention is not limited thereto.

Then, the plurality of ceramic sheets having the first and second internal electrodes 121 and 122 formed thereon are alternately laminated, and then the plurality of ceramic sheets and the first and second internal electrodes 121 and 122 formed on the ceramic sheets are pressed by applying pressure in a lamination direction, to thereby form a laminate.

Then, the laminate is cut into regions corresponding to a single capacitor in a single chip form, such that ends of the first and second internal electrodes 121 and 122 are alternately exposed to both end surfaces of the laminate, Then, the cut laminate in the single chip form is fired at a relatively high temperature, to complete a ceramic body 110 having a plurality of first and second internal electrodes 121 and 122.

Then, first and second external electrodes 131 and 141 are formed on both end surfaces of the ceramic body 110 by using a conductive paste including copper (Cu) or the like, so that the first and second external electrodes 131 and 141 cover the exposed portions of the first and second internal electrodes 121 and 122 to be electrically connected to the first and second internal electrodes 121 and 122, respectively.

Then, a conductive resin paste is coated on surfaces of the first and second external electrodes 131 and 141, and then dried in a drying furnace of 100° C. for about 10 minutes, to form first and second conductive resin layers 132 and 142. After that, the ceramic body 110 is hardened in a hardening furnace of 120° C. for about 2 hours.

The conductive resin paste may include 10 to 50 wt % of a gel type silicon rubber such as polydimethylsiloxane (PDMS) and 50 to 90 wt % of conductive metal powder particles. Here, conductive metal powder particles of the conductive resin paste may include at least one of copper (Cu), silver (Ag), and copper coated with silver thereon.

In addition, the viscosity of the conductive resin paste may be 8,000 to 50,000 cPs. Within the above viscosity range, the ratio of thickness of respective parts corresponding to both end surfaces of the ceramic body 110 and a thickness of a part corresponding to a corner portion of the ceramic body 110 in the first and second conductive resin layers 132 and 142 is within the range of 1~5:1, and thus the 'thickness uniformity' may be good.

Then, surfaces of the thus hardened first and second conductive resin layers 132 and 142 are subjected to a plating treatment. Here, as a material used for plating, nickel or tin, a nickel-tin alloy, or the like may be used. As necessary, nickel plating layers 133 and 143 and tin plating layers 134 and 144 may be sequentially formed on the surfaces of the first and second conductive resin layers 132 and 142.

As set forth above, according to the embodiments of the present invention, the conductive resin layer formed between the external electrode and the plating layer is formed of a silicon rubber such as polydimethylsiloxane (PDMS) instead of epoxy, so that there is provided a multilayer ceramic capacitor capable of having excellent moisture resistance and improved external electrode flexure strength.

While the present invention has been shown and described in connection with the embodiments, it will be apparent to those skilled in the art that modifications and variations can be made without departing from the spirit and scope of the invention as defined by the appended claims.

What is claimed is:

1. A conductive resin composition, comprising:
   10 to 50 wt % of a gel type silicone rubber such as polydimethylsiloxane (PDMS); and
   50 to 90 wt % of conductive metal powder particles.

2. The conductive resin composition of claim 1, wherein the conductive resin composition has viscosity of 8,000 to 50,000 cPs.

3. The conductive resin composition of claim 1, wherein the conductive metal powder particles include at least one of copper (Cu), silver (Ag), and copper coated with silver thereon.

4. A multilayer ceramic capacitor, comprising:
   a ceramic body having a plurality of laminated dielectric layers therein;

a plurality of first and second internal electrodes formed on at least one surface of the dielectric layers, and alternately exposed to both end surfaces of the ceramic body;

first and second external electrodes formed on both end surfaces of the ceramic body, respectively, and electrically connected to the first and second internal electrodes, respectively;

first and second conductive resin layers formed on surfaces of the first and second external electrodes, respectively, the first and second conductive resin layers being formed of a conductive resin composition including 10 to 50 wt % of a gel type silicone rubber such as polydimethylsiloxane (PDMS) and 50 to 90 wt % of conductive metal powder particles; and first and second plating layers formed on surfaces of the first and second conductive resin layers, respectively.

5. The multilayer ceramic capacitor of claim 4, wherein the conductive resin composition has viscosity of 8,000 to 50,000 cPs.

6. The multilayer ceramic capacitor of claim 4, wherein the conductive metal powder particles include at least one of copper (Cu), silver (Ag), and copper coated with silver thereon.

7. The multilayer ceramic capacitor of claim 4, wherein in the first and second conductive resin layers, a ratio of thickness of a part corresponding to a center portion of the ceramic body to thickness of a part corresponding to a corner portion of the ceramic body satisfies a range of 1~5:1.

8. The multilayer ceramic capacitor of claim 4, wherein the first and second plating layers respectively include a nickel (Ni) plating layer formed on the surface of the first and second conductive resin layers, respectively, and a tin (Sn) plating layer formed on a surface of the nickel plating layer.

9. A method of manufacturing a multilayer ceramic capacitor, the method comprising:

preparing a plurality of ceramic sheets;

forming first and second internal electrodes on at least one surface of the ceramic sheets, respectively;

laminating the plurality of ceramic sheets having the first and second internal electrodes formed thereon to form a laminate;

cutting the laminate such that one end of the first and second internal electrodes are alternately exposed to both end surfaces of the laminate, respectively;

firing the cut laminate to form a ceramic body having the plurality of first and second internal electrodes;

forming first and second external electrodes of a conductive paste on both end surfaces of the ceramic body to thereby allow the first and second external electrodes to be electrically connected to exposed portions of the first and second internal electrodes, respectively;

forming first and second conductive resin layers of a conductive resin paste on surfaces of the first and second external electrodes, the conductive resin paste including 10 to 50 wt % of a gel type silicone rubber such as polydimethylsiloxane (PDMS) and 50 to 90 wt % of conductive metal powder particles; and plating surfaces of the first and second conductive resin layers.

10. The method of claim 9, wherein in the forming of the first and second conductive resin layers, the conductive resin paste has viscosity of 8,000 to 50,000 cPs.

11. The method of claim 9, wherein in the forming of the first and second conductive resin layers, conductive metal powder particles of the conductive resin paste include at least one of copper (Cu), silver (Ag), and copper coated with silver thereon.

12. The method of claim 9, wherein in the forming of the first and second conductive resin layers, a ratio of thickness of respective parts corresponding to both end surfaces of the ceramic body and a thickness of a part corresponding to a corner portion of the ceramic body satisfies a range of 1~5:1.

13. The method of claim 9, wherein in the plating of the surfaces of the first and second conductive resin layers, a nickel (Ni) plating layer is formed on the surfaces of the first and second conductive resin layers and then a tin (Sn) plating layer is formed on a surface of the nickel plating layer.

\* \* \* \* \*